(12) United States Patent
Steele

(10) Patent No.: US 10,485,157 B1
(45) Date of Patent: Nov. 26, 2019

(54) GROWING MEDIUM CUTTING TOOL

(71) Applicant: Mike Steele, Apple Valley, CA (US)

(72) Inventor: Mike Steele, Apple Valley, CA (US)

( * ) Notice: Subject to any disclaimer, the term of this patent is extended or adjusted under 35 U.S.C. 154(b) by 0 days.

(21) Appl. No.: 16/033,146

(22) Filed: Jul. 11, 2018

(51) Int. Cl.
*B26B 3/00* (2006.01)
*A01C 5/02* (2006.01)
*A01B 1/00* (2006.01)

(52) U.S. Cl.
CPC . *A01C 5/02* (2013.01); *A01B 1/00* (2013.01)

(58) Field of Classification Search
CPC ......... B26B 27/00; A01B 1/246; A01B 1/165; A01G 3/06; A01C 5/02
USPC ...... 30/316, 113.1, 301, 302, 300, 310, 278, 30/340; 172/371, 22, 20, 864.44, 21, 25, 172/430, 135, 41, 374.19
See application file for complete search history.

(56) References Cited

U.S. PATENT DOCUMENTS

| | | | | |
|---|---|---|---|---|
| 1,857,383 A | * | 5/1932 | Johnson | A01G 3/06 172/18 |
| 2,809,864 A | * | 10/1957 | Carr | A01G 3/06 172/13 |
| 3,064,353 A | * | 11/1962 | Montgomery | A01G 3/06 30/310 |
| 3,127,939 A | * | 4/1964 | Rink | A01G 3/06 172/13 |
| 3,786,564 A | * | 1/1974 | Acheson | B26B 27/00 30/124 |
| 4,204,577 A | * | 5/1980 | Bittle | A63B 57/357 172/25 |
| 5,398,624 A | * | 3/1995 | Caron | A01B 1/165 111/106 |
| 5,461,788 A | * | 10/1995 | Taylor | A01D 34/84 172/25 |
| 6,662,879 B1 | * | 12/2003 | Costa | A01C 5/02 172/22 |
| 2003/0070302 A1 | * | 4/2003 | Arbanas | A01B 1/246 30/316 |
| 2003/0196334 A1 | * | 10/2003 | Finney | A01B 1/246 30/300 |
| 2006/0108129 A1 | * | 5/2006 | Van Denham | A01C 5/02 172/371 |
| 2006/0277766 A1 | * | 12/2006 | Moore | B26B 27/00 30/316 |

\* cited by examiner

*Primary Examiner* — Ghassem Alie
(74) *Attorney, Agent, or Firm* — Jafari Law Group, Inc.

(57) ABSTRACT

The invention involves a growing medium cutting tool that, in exemplary embodiments, includes a handle fixedly and distally connected a hollow incising body via a vertical shaft. The growing medium cutting tool is a unitary apparatus with no moving parts, and the hollow incising body defines a cavity completely devoid of any internal structures. The hollow incising body also has a pointed perimeter on its bottom edge useful for penetrating the growing medium. The growing medium cutting tool provides simple, effective, and inexpensive relief to gardeners who need to quickly and precisely create a hole within a growing medium.

19 Claims, 3 Drawing Sheets

GROWING MEDIUM CUTTING TOOL

TECHNICAL FIELD OF THE INVENTION

The present invention relates generally to gardening tools and more specifically to a cutting tool for making incision in a growing medium for plants.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Gardening apparatuses capable of creating holes in dirt or other growing mediums, such as rockwool, are well known in the art. However, the gardening apparatuses described in the prior art are overly complex, difficult to use, and expensive. These negative attributes are due in part to the fact that the prior art teaches such apparatuses use several components, many of which utilize moving parts to create holes.

For example, U.S. Pat. No. 3,273,930 to Gottfried discloses a hand-operated device capable of extracting soil from the ground. To operate the Gottfried device, a user presses a serrated edge of the device into the ground and twists the device to loosen the soil and roots. Once a desired depth has been achieved, the user lifts the device to extract the soil. The user must then press down on a knob to expel the collected soil from the device. Not only do the moving components make this device unnecessarily complex and cumbersome, but the twisting motion required to break up the soil and roots results in a hole that is neither neat nor conducive to receiving plants.

U.S. Pat. No. 3,707,197 to Walesch et al. discloses a similar device for removing a core of ground. To operate, a user places a large cylinder on the ground and presses down on the device using a handle. Pressing down on the handle causes a rod within the cylinder to penetrate the ground and, upon pulling up on the handle, remove a core of dirt. This device too is complicated because of the use of moving components. Furthermore, the Walesch et al. device is bulky and cumbersome, making it less functional and appealing to users.

The prior art illuminates a clear deficiency in existing hole-creating gardening devices. Therefore, there exists a previously unappreciated need for a new and improved growing medium cutting tool that is simple to operate, relatively inexpensive, and easy to transport. The present invention overcomes the above-described disadvantages of presently existing growing medium cutting tools.

It is to these ends that the present invention has been developed.

SUMMARY OF THE INVENTION

To minimize the limitations in the prior art, and to minimize other limitations that will be apparent upon reading and understanding the present specification, the present invention describes a growing medium cutting tool which can be simply operated by a user to cut a hole into a growing medium, such as rockwool.

A cutting tool in accordance with one embodiment of the present invention includes a handle fixedly attached to a vertical shaft at an upper exterior surface of said vertical shaft, and a hollow incising body comprising a bottom edge, an exterior outer surface, and an exterior side surface which together define a single cavity devoid of internal structures, the hollow incising body attached to a lower exterior surface of said vertical shaft, wherein the handle and the hollow incising body are distally located from each other along a vertical axis of the cutting tool.

Another cutting tool in accordance with one embodiment of the present invention includes a hollow incising body comprising a bottom edge, an exterior outer surface, and an exterior side surface which together define a single cavity devoid of internal structures, the hollow incising body attached to a lower exterior surface of a vertical shaft, and a cylindrical handle as long as the width of the exterior outer surface of the hollow incising body fixedly attached to the vertical shaft at an upper exterior surface of said vertical shaft, wherein the handle and the hollow incising body are distally located from each other along a vertical axis of the cutting tool.

Another cutting tool in accordance with one embodiment of the present invention includes a hollow incising body comprising a bottom edge with a pointed perimeter, an exterior outer surface, and an exterior side surface which together define a single cavity devoid of internal structures, the hollow incising body attached to a lower exterior surface of a vertical shaft; and a cylindrical handle as long as the width of the exterior outer surface of the hollow incising body fixedly attached to the vertical shaft at an upper exterior surface of said vertical shaft; wherein the handle and the hollow incising body are distally located from each other along a vertical axis of the cutting tool.

A method of making an incision in a growing medium in accordance with one embodiment of the present invention comprises the steps of: grasping a cutting tool by a handle attached to an upper exterior surface of a vertical shaft, placing a hollow incising body attached to a lower exterior surface of said vertical shaft against a growing medium, pushing on said handle with force sufficient to penetrate said growing medium, removing the cutting tool, removing the incised portion of the growing medium to create a hole; and filling said hole with an object.

These advantages and features of the present invention are not meant as limiting objectives, but are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows:

FIG. 1(*a*) is an orthogonal front view of one embodiment of a growing medium cutting apparatus in accordance with the present invention.

DETAILED DESCRIPTION OF THE INVENTION

Figures 1A, 1B, 1C, 1D:
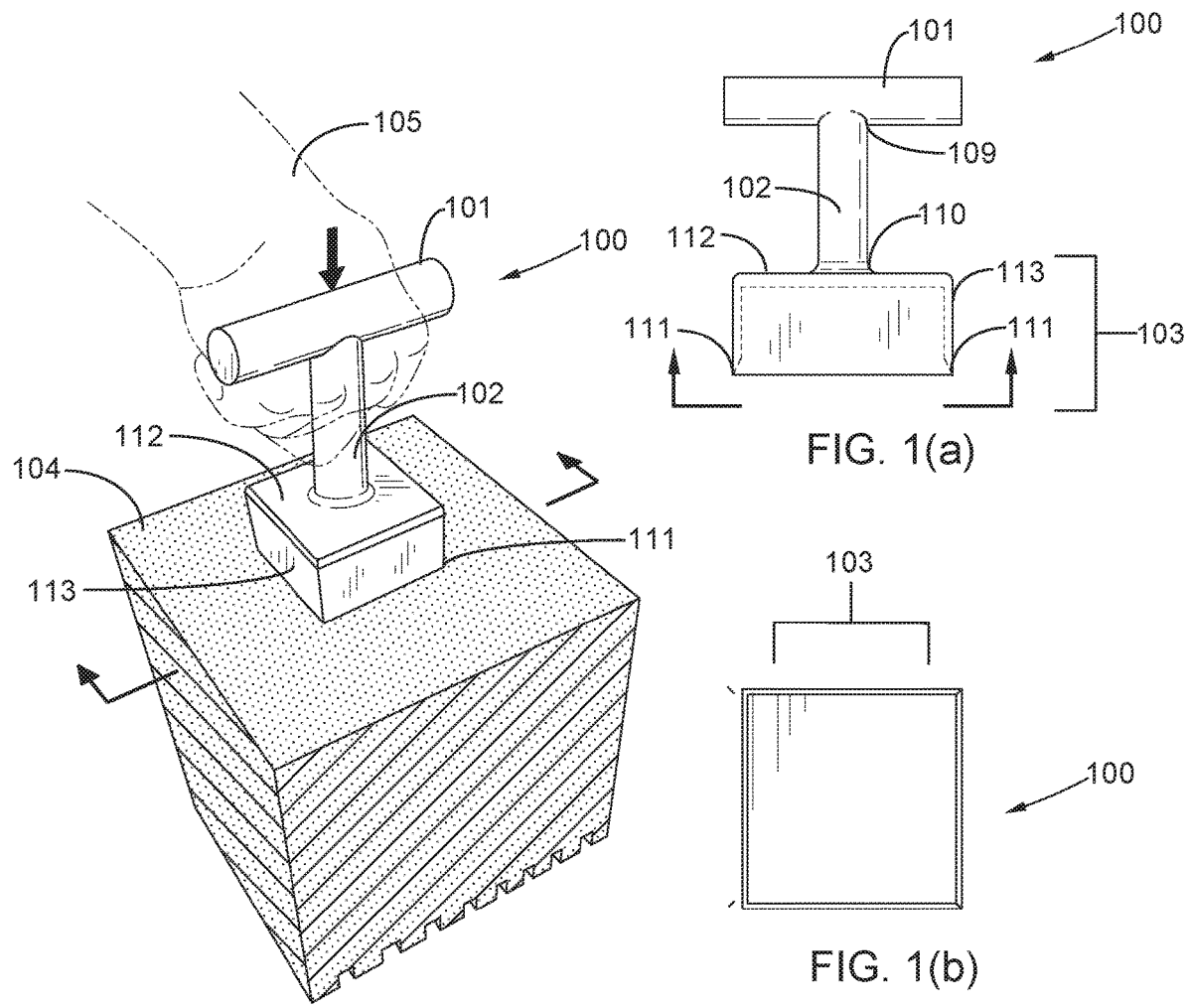
FIG. 1(b) is an orthogonal view of the underside of one embodiment of the growing medium cutting apparatus in accordance with the present invention.
FIG. 1(c) is an orthogonal view of the underside of one embodiment of the growing medium cutting apparatus in accordance with the present invention.
FIG. 1(d) is a perspective view of the growing medium cutting apparatus being used to make an incision into a growing medium in accordance with the present invention.

In the following discussion that addresses a number of embodiments and applications of the present invention, reference is made to the accompanying figures, which form a part thereof. Depictions are made, by way of illustration, of specific embodiments in which the invention may be practiced; however, it is to be understood that other embodiments may be utilized and changes may be made without departing from the scope of the present invention.

In the following detailed description, numerous specific details are set forth by way of examples in order to provide a thorough understanding of the relevant teachings. However, it should be apparent to those skilled in the art that the present teachings may be practiced without such details. In other instances, well-known structures, components, and/or functional or structural relationship thereof, etc., have been described at a relatively high level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example," as used herein, does not necessarily refer to the same embodiment. It is intended, for example, that the claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments, whether these features, elements, and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc., may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can include only A, some embodiments can include only B, some embodiments can include only C, and some embodiments can include A, B, and C. The term "and/or" is used to avoid unnecessary redundancy. Similarly, terms such as "a," "an," or "the," again, may be understood to convey a singular usage or to convey a plural usage, depending at least in part upon context. In addition, the term "based on" may be understood as not necessarily intended to convey an exclusive set of facts and may, instead, allow of the existence of additional facts not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods, Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Generally, the invention is a growing medium cutting apparatus that, in exemplary embodiments, may include a handle distally connected to a hollow incising body devoid of any internal structures via a vertical shaft. The handle may be cylindrical, and the hollow incising body, which may define a single cavity, may have a bottom edge that comprises a sharpened or pointed perimeter.

Turning now to the figures, FIG. 1(a) is a front orthogonal view of a growing medium cutting tool, FIG. 1(b) is a bottom orthogonal view of one embodiment of the cutting tool, FIG. 1(c) is a bottom orthogonal view of another embodiment of the cutting tool, and FIG. 1(d) is a perspective view of a user using the cutting tool to create incisions in a growing medium. Specifically, FIG. 1(a) illustrates cutting tool 100, which may include handle 101, vertical shaft 102, and hollow incising body 103. In some exemplary embodiments of the present invention, the component parts of cutting tool 100 comprise a unitary apparatus, i.e., that no individual component may be separated from cutting tool 100. For example, and without limiting the scope of the present invention, in some exemplary embodiments, handle 101 and shaft 102 are integral with hollow incising body 103.

Vertical shaft 102 may be comprised of upper exterior surface 109 and lower exterior surface 110. Vertical shaft 102 may extend vertically from handle 101 and hollow incising body 103. Having vertical shaft 102 extend vertically from handle 101 and hollow incising body 103 may allow a user to apply more downward force from handle 101 to hollow incising body 103. This in turn may cause hollow incising body 103 to more easily penetrate growing medium 104 (see FIGS. 2(a)-2(c)) because an applied force may be more readily imparted from handle 101 to hollow incising body 103.

In some exemplary embodiments, vertical shaft 102 may be cylindrically shaped. However, vertical shaft 102 may be other shapes, such as but not limited to, rectangular, square or circular. In preferred embodiments, vertical shaft 102 may be comprised of a similar or same length as a length of handle 101. However, in some exemplary embodiments of the present invention, vertical shaft 102 may have a greater or shorter length than the length of handle 101.

In some embodiments, vertical shaft 102 may be constructed out of a material strong and sturdy enough to maintain its shape while under the pressure associated with using cutting tool 100. By way of example and not limitation, vertical shaft 102 may be constructed out of steel and/or aluminum alloys. Of course, other materials known in the art, such as wood and/or thermoset plastics, are contemplated by the present invention. In an exemplary embodiment, this component comprises stainless steel benefiting from its sterile properties.

Handle 101 may be fixedly attached to vertical shaft 102 at upper exterior surface 109 of vertical shaft 102. Furthermore, upper exterior surface 109 of vertical shaft 102 may be fixedly attached to a center point of an underside surface of handle 101. Thus, in some exemplary embodiments of the present invention, handle 101 and vertical shaft 102 together form a "T" shape. Having upper exterior surface 109 of vertical shaft 102 attach to a center point of handle 101 may help prevent a user from wasting energy when using cutting tool 100 to make an incision in growing medium 104 (see FIG. 1(d)). Additionally, a T-shaped handle 101 and vertical shaft 102 may aid in the strength and durability of cutting tool 100, as applying force to an off-center handle may cause vertical shaft 102 to break.

To further promote the concept of not wasting energy when using cutting tool 100, handle 101 may be substantially as long as the length of vertical shaft 102. However, handle 101 may be longer or shorter than vertical shaft 102 without deviating from the scope or spirit of the present invention. In some embodiments, as described below in more detail, handle 101 may be substantially as long as the length of exterior outer surface 112 of hollow incising body 103.

In some embodiments of the present invention, handle 101 may be cylindrically shaped. Having handle 101 shaped like a cylinder may allow a user to more easily grasp handle 101 and impart downward force to cutting tool 100 since a round shape may more readily conform to the palm of a user's hand. Handle 101 may be otherwise shaped, however, without departing from the present invention's scope or spirit.

Handle 101 may be smooth, apart from where handle 101 is fixedly connected to vertical shaft 102. In other embodiments of the present invention, handle 101 may have shallow grooves on an underside surface of handle 101 on either side of vertical shaft 102 to provide grip support for the user.

In some embodiments, handle 101 may be constructed out of a material strong and sturdy enough to maintain its shape while under the pressure associated with using cutting tool 100. By way of example and not limitation, handle 101 may be constructed out of steel and/or aluminum alloys. Of course, other materials known in the art, such as wood and/or thermoset plastics, are contemplated by the present invention. In an exemplary embodiment, this component comprises stainless steel benefiting from its sterile properties.

Hollow incising body 103 may be comprised of bottom edge 111, exterior outer surface 112, and exterior side surface 113. It is contemplated by the present invention that hollow incising body 103 may be square shaped, as seen in FIG. 1(b). Given that many plants come in square containers, it is conducive to the gardening process to have the hole into which the plants are transplanted be the same shape as the root ball of the plant, which often retain the shape of the plant's previous container. Of course, hollow incising body 103 may be formed in a shape other than square without deviating from the spirit or scope of the present invention. By way of example and not limitation, hollow incising body 103 may be circular (see FIG. 1(c)).

In preferred embodiments of the present invention, bottom edge 111, exterior outer surface 112, and exterior side surface 113 of hollow incising body 103 may together define a single, hollow cavity completely devoid of any internal structures. That is to say, the interior surface of hollow incising body 103 may be smooth and thus may not intentionally capture or collect any growing medium after cutting tool 100 is removed from growing medium 104. Similarly, divisions, interior walls or any structure of any kind is typically absent within the cavity formed by the walls of hollow incising body 103. The lack of internal structures within the cavity defined by bottom edge 111, exterior outer surface 112, and exterior side surface 113 may promote the ease of use by which a user may operate cutting tool 100 as there are not separate components for the user to operate. Furthermore, having hollow incising body 103 be hollow may make cutting tool 100 less expensive, less cumbersome, and less likely to need repairs as there are fewer components that may become broken, as opposed to the apparatuses in the prior art.

Figure 2A:
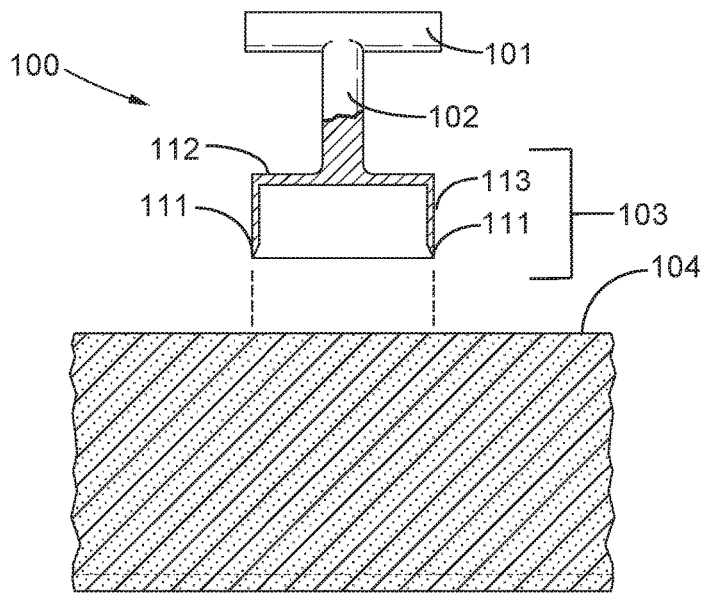
FIGS. 2(a)-2(c) are cutaway views of the growing medium cutting apparatus making an incision into a growing medium in accordance with the present invention.
Figure 2B:
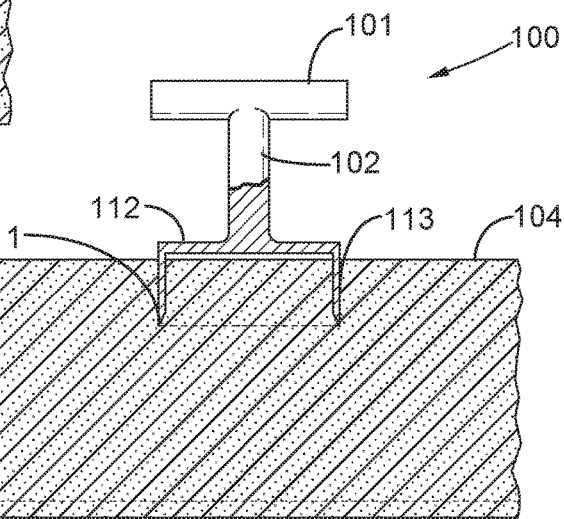
Figure 2C:
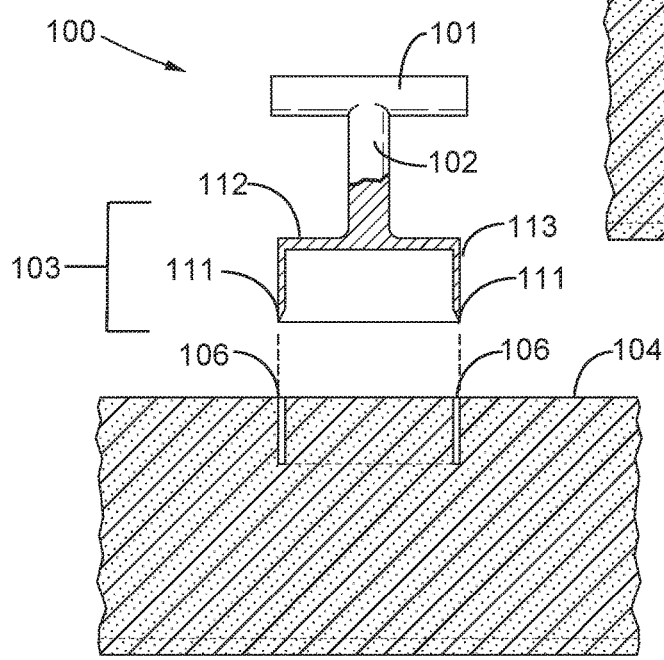

Bottom edge 111 of hollow incising body 103 may comprise a sharpened or pointed perimeter (see FIGS. 2(a)-2(c)). A pointed perimeter may facilitate hollow incising body's 103 penetration into growing medium 104 because a pointed, or sharp, surface concentrates the mass of cutting tool 100 into a smaller area similar to the concept incorporated by a pointed digging shovel. Having bottom edge 111 comprise a pointed perimeter, as opposed to a blunt or dull perimeter, may also allow a user to create incisions within growing medium 104 that are neat and precise since a pointed perimeter may obviate the need to twist cutting tool 100 to penetrate growing medium 104.

Hollow incising body 103 may be fixedly attached to vertical shaft 102 at lower exterior surface 110 of vertical shaft 102. Furthermore, lower exterior surface 110 of vertical shaft 102 may be fixedly attached to a center point of exterior outer surface 112 of hollow incising body 103. Having lower exterior surface 110 of vertical shaft 102 attach to a center point of exterior outer surface 112 of hollow incising body 103 may help prevent a user from wasting energy when using cutting tool 100 to make an incision in growing medium 104. This is because an off-center vertical shaft 102 would apply more force to one side of hollow incising body 103 and less force to the opposite side, resulting in an awkward and uneven incision into growing medium 104.

To further promote the concept of not wasting energy when using cutting tool 100, exterior outer surface 112 of hollow incising body 103 may be substantially as long as handle 101. Having exterior outer surface 112 of hollow incising body 103 be substantially as long as handle 101 may better promote the distribution of force when a user operates cutting tool 100. However, it is also contemplated by the present invention that exterior outer surface 112 of hollow incising body 103 may be longer or shorter than handle 101.

In some embodiments, hollow incising body 103 may be constructed out of a material strong and sturdy enough to maintain its shape while under the pressure associated with using cutting tool 100. By way of example and not limitation, hollow incising body 103 may be constructed out of steel and/or aluminum alloys. Of course, other materials known in the art, such as wood and/or thermoset plastics, are contemplated by the present invention. In an exemplary embodiment, this component comprises stainless steel benefiting from its sterile properties.

Turning to the next set of figures, FIGS. 2(a)-2(c) illustrate cutaway views of cutting tool 100 being used to create incision 106 within growing medium 104. To use cutting tool 100 to incise a portion of growing medium 104, a user may first place cutting tool 100 over growing medium 104 such that bottom edge 111 of hollow incising body 103 may abut growing medium 104. Once the user has placed cutting tool 100 over the portion of growing medium he or she wishes to penetrate, a user may grasp handle 101 with their hand 105 (see FIG. 1(d)). Alternatively, a user may use his or her foot (not shown) to apply downward force to cutting tool 100. The user may then continually apply downward force to handle 101 until bottom edge 111 of hollow incising body 103 penetrates growing medium 104 to a depth sufficient for the user's needs. After removing cutting tool 100 from growing medium 104, incision 106 may be visible to the user. As can be seen by FIG. 2(c), the portion of growing medium 104 contained within the boundary of incision 106 may remain in place after the removal of cutting tool 100, i.e., the incised portion of growing medium 104 may not intentionally be removed when a user pulls up on cutting tool 100 to remove it from growing medium 104. The portion of growing medium 104 contained within incision 106 may be removed by any method known in the art, such as by hand, shovel, and/or a trowel.

Figure 3A:
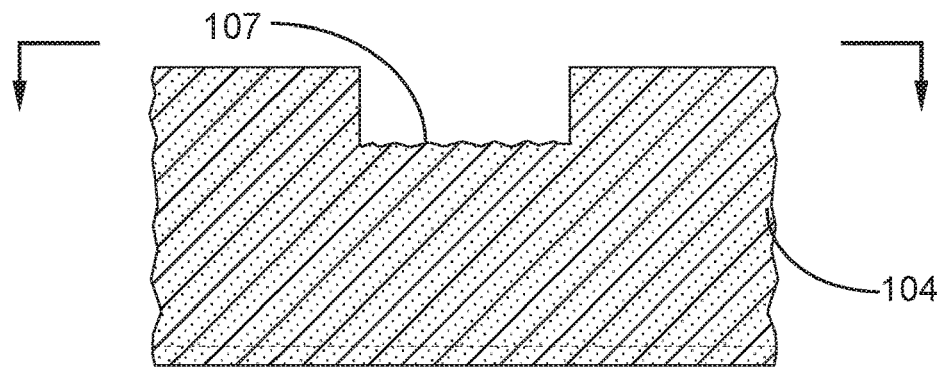
FIG. 3(a) is a front orthogonal view of a growing medium after a portion of the growing medium has been removed from an incision created by the growing medium cutting apparatus in accordance with the present invention.
Figure 3B:
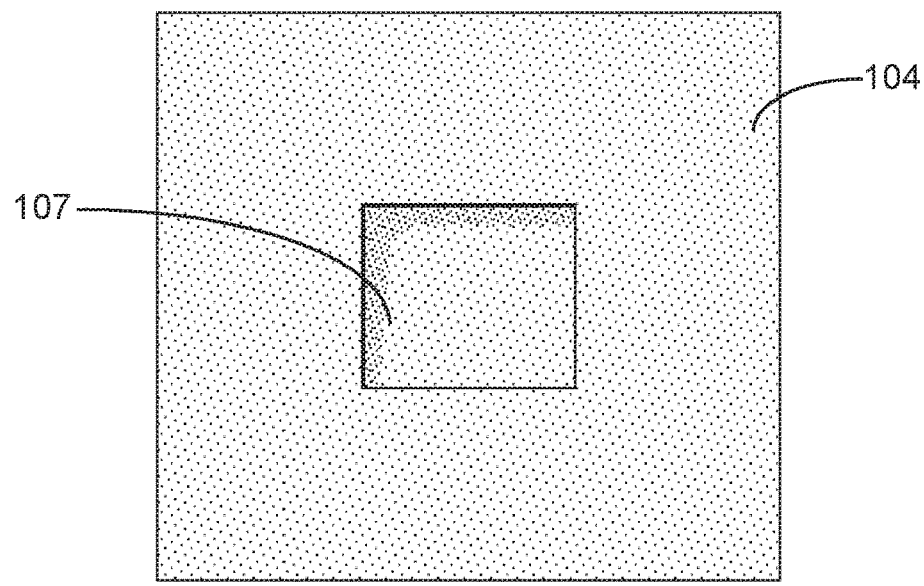
FIG. 3(b) is a top orthogonal view of a growing medium after a portion of the growing medium has been removed from an incision created by the growing medium cutting apparatus in accordance with the present invention.
Figure 3C:
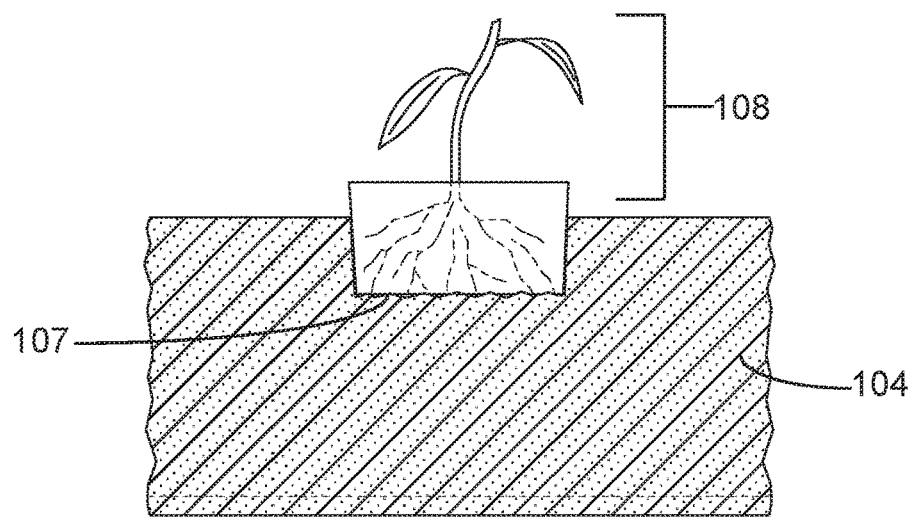
FIG. 3(c) is a front orthogonal view of a plant inserted into a growing medium in the incision created by the growing medium cutting apparatus in accordance with the present invention.

Turning to the final set of figures, FIGS. 3(a)-3(c) depict illustrations of growing medium 104 after the portion of growing medium 104 contained within incision 106 has been removed. After said portion of growing medium 104 is removed, incision hole 107 is created. As best illustrated in FIG. 3(b), incision hole 107 may substantially match the shape and height of hollow incising body 103. A user may then transplant an object into incision hole 107. It is contemplated by the present invention that plant 108 may be transplanted into incision hole 107. In some embodiments, growing medium 104 may be, by way of example only, rockwool, a common growing medium known in the art. In such embodiments, plant 108 may be a hydroponically grown plant, such as, but not limited to, strawberries, potatoes, tomatoes, mint, basil, lettuce, cabbage, green beans or any other hydroponically grown plant.

A growing medium cutting apparatus has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A cutting tool comprising:
 a handle fixedly situated at an upper end of a vertical shaft; and
 a hollow incising body fixedly situated at a lower end of said vertical shaft, the hollow incising body comprising a bottom edge, a flat exterior outer surface, an exterior side surface, and walls with a smooth interior surface, which together define a single cavity devoid of internal structures;
 wherein the handle and the hollow incising body are distally located from each other along a vertical axis of the cutting tool;
 wherein a length of the handle is as long as a length of the exterior outer surface of the hollow incising body and as long as a length of the vertical shaft;
 wherein the handle is integral with the vertical shaft; and
 wherein the vertical shaft is integral with the exterior outer surface of the hollow incising body;
 wherein the bottom edge of the hollow incising body is configured to create an incision in a growing medium; and
 wherein the walls with a smooth interior surface are configured to reduce an amount of growing medium remaining in the hollow incising body when the cutting tool is removed from the growing medium.

2. The cutting tool of claim 1, wherein the bottom edge of the hollow incising body comprises a pointed perimeter.

3. The cutting tool of claim 1, wherein the upper end of the vertical shaft is situated at a center point of the handle.

4. The cutting tool of claim 1, wherein the lower end of the vertical shaft is situated at a center point of the exterior outer surface of the hollow incising body.

5. The cutting tool of claim 1, wherein the handle is cylindrical.

6. The cutting tool of claim 1, wherein the hollow incising body is rectangular.

7. The cutting tool of claim 1, wherein the hollow incising body is circular.

8. A cutting tool comprising:
 a hollow incising body fixedly situated at a lower end of a vertical shaft, the hollow incising body comprising a bottom edge, a flat exterior outer surface, an exterior side surface, and walls with a smooth interior surface, which together define a single cavity devoid of internal structures; and
 a cylindrical handle as long as a width of the exterior outer surface of the hollow incising body and as long as a length of the vertical shaft fixedly situated at an upper end of the vertical shaft;
 wherein the cylindrical handle and the hollow incising body are distally located from each other along a vertical axis of the cutting tool; and
 wherein the handle is integral with the vertical shaft; and
 wherein the vertical shaft is integral with the exterior outer surface of the hollow incising body;
 wherein the bottom edge of the hollow incising body is configured to create an incision in a growing medium; and
 wherein the walls with a smooth interior surface are configured to reduce an amount of growing medium remaining in the hollow incising body when the cutting tool is removed from the growing medium.

9. The cutting tool of claim 8, wherein the bottom edge of the hollow incising body comprises a pointed perimeter.

10. The cutting tool of claim 8, wherein the upper end of the vertical shaft is situated at a center point of the cylindrical handle.

11. The cutting tool of claim 8, wherein the lower end of the vertical shaft is situated at a center point of the exterior outer surface of the hollow incising body.

12. The cutting tool of claim 8, wherein the hollow incising body is rectangular.

13. The cutting tool of claim 8, wherein the hollow incising body is circular.

14. A cutting tool comprising:
 a hollow incising body fixedly situated at a lower end of a vertical shaft, the hollow incising body comprising a bottom edge with a pointed perimeter, a flat exterior outer surface, an exterior side surface, and walls with a smooth interior surface, which together define a single cavity devoid of internal structures; and
 a cylindrical handle as long as the width of the exterior outer surface of the hollow incising body and as long as a length of the vertical shaft fixedly situated at an upper end of the vertical shaft;
 wherein the cylindrical handle and the hollow incising body are distally located from each other along a vertical axis of the cutting tool; and
 wherein the handle is integral with the vertical shaft;
 wherein the vertical shaft is integral with the exterior outer surface of the hollow incising body;
 wherein the bottom edge of the hollow incising body is configured to create an incision in a growing medium; and
 wherein the walls with a smooth interior surface are configured to reduce an amount of growing medium remaining in the hollow incising body when the cutting tool is removed from the growing medium.

15. The cutting tool of claim 14, wherein the vertical shaft is attached to the cylindrical handle at a center point of the cylindrical handle.

16. The cutting tool of claim 14, wherein the lower end of the vertical shaft is situated at a center point of the exterior outer surface of the hollow incising body.

17. The cutting tool of claim 14, wherein the hollow incising body is rectangular.

18. The cutting tool of claim 14, wherein the hollow incising body is square.

19. The cutting tool of claim 14, wherein the hollow incising body is circular.

* * * * *